Figure 1:
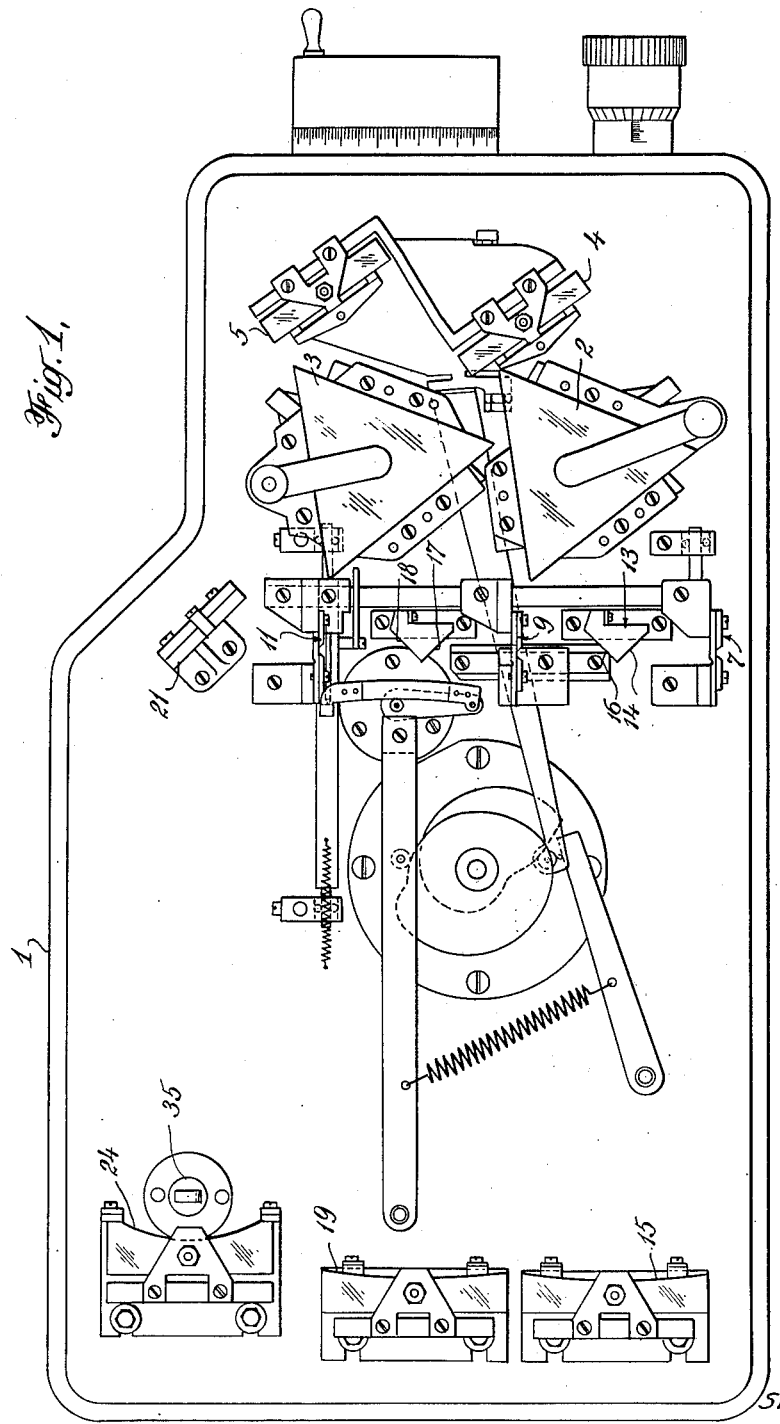

May 6, 1952  S. ROSIN  2,595,706
MONOCHROMATOR WITH SLIT REFLECTING
MIRRORS IN COLLIMATED LIGHT BEAMS
Filed March 26, 1949  2 SHEETS—SHEET 2

INVENTOR
SEYMOUR ROSIN
BY
Pennie, Edmonds, Morton and Barrows
ATTORNEYS

Patented May 6, 1952

2,595,706

UNITED STATES PATENT OFFICE 2,595,706

MONOCHROMATOR WITH SLIT REFLECTING MIRRORS IN COLLIMATED LIGHT BEAMS

Seymour Rosin, New York, N. Y., assignor to Farrand Optical Co., Inc., New York, N. Y., a corporation of New York Application March 26, 1949, Serial No. 83,551

7 Claims. (Cl. 88—14)

This invention relates to spectrometric instruments employing spherical mirrors as collimating and focusing elements. Such instruments have the advantage that spherical mirrors are free from chromatic error, so that no adjustment of the optical path length between the entrance and exit slits need be made to fit the various wave lengths successively passed through the instrument.

The use of spherical mirrors as collimating and focusing elements is particularly advantageous in monochromators of the Littrow type in which the radiation passes twice through a single dispersing element located between a plane mirror and collimating and focusing element. The same spherical mirror then serves both to render parallel the incoming radiation for dispersion and to focus on the exit slit after it has passed twice through the dispersing prism the radiation of a selected wave length determined by the orientation of the plane mirror.

A problem with such instruments is the necessity for working "off the axis" of the spherical mirror in order to separate the entering from the emerging beams.

Considering for a moment the entrance slit of such an instrument as a point source, imaged at the exit slit, it is evident that if the focal points constituted by the entrance and exit slits are not to coincide, either actually or virtually, the cones of which these points are the respective apices cannot coincide, so that the beams of parallel light whose intersections on the spherical mirror are the bases of those cones may not coincide. The beams of parallel light have a common intersection with the surface of the plane Littrow mirror. Being noncoincident, they must strike the spherical mirror on noncoincident areas and are therefore not parallel to each other.

This noncoincidence of the intersections of the beams of parallel light (hereinafter sometimes referred to as the parallel beams) with the spherical mirror limits the size of the parallel beams which can be handled by a spherical mirror of given size. It therefore limits the size of the aperture stop employed to define these beams, and hence the relative aperture which can be employed with the given spherical mirror. These limitations are especially troublesome in the design of a double monochromator, in which two optical trains are to be placed side by side at separations which are limited by the focal length of the mirrors employed, but where the spherical mirrors cannot of course be allowed to interfere mechanically with each other  It also increases the aberrations of the system.

The divergence of the parallel beams from parallelism with each other is usually described in the art by the statement that the spherical mirror is used "off axis," the term "axis" in this expression referring to the radius of the spherical mirror which is at least roughly the axis of symmetry of the mirror.

Since, in contrast to a lens, a spherical mirror possesses only one spherical surface and one center of curvature, there is associated therewith no single axis which is unique to all object and image points. There is in fact an axis for each image and object point, defined for each such point as the line passing through the point in question and the center of curvature of the mirror. Since the object and image points formed by the entrance and exit slits do not coincide, there are at once two separate axes for a single element, the spherical mirror, and it is desirable to choose another axis for this mirror and for the system as a whole, with reference to which all of the elements of the system may be located. It is convenient to select as the axis of the spherical mirror and of the entire instrument the radius of the spherical mirror which bisects the angle between the two parallel beams. The mirror is of course dimensioned and positioned so as to extend equally on either side of this "system axis" in the plane of the angle between the parallel beams, so that this axis is the axis of symmetry of the spherical mirror, and its intersection with the mirror surface is centered on the available area thereof.

Since the spectrometric instruments under consideration employ collimated light, the entrance and exit slits are located (virtually) on the focal surface of the spherical mirror, on opposite sides of the system axis. Their angular departure from the system axis is the angular distance "off axis" at which the system is worked. The angle subtended at the center of curvature of the mirror by the virtual object and image points is equal to the angular separation of the two parallel beams and amounts to twice the "off axis" angle. This follows from the fact that each parallel beam is parallel to the true axis of the spherical mirror with respect to the focus with which it is associated.

I have devised a monochromator employing a spherical mirror in which the off axis angle may be readily made less than three quarters of a degree, but having a relative aperture of F5, and in which the spherical mirror is so compact that a second optical train may be placed immediately adjacent the first without mechanical interference between the spherical mirrors, thus providing a double monochromator of high aperture, low aberrations and compact construction.

I achieve these advantages by moving the plane mirrors at which the light is reflected from the entrance slit onto the spherical mirror before the first prism transit and at which it is reflected from the spherical mirror to the exit slit after the second prism transit into the parallel beams with which these mirrors are associated. These mirrors will accordingly be called Newtonian mirrors hereinafter.

The invention will be described as applied to a double monochromator, although its utility is not restricted thereto. In particular the separate halves of the double monochromator may be optically identical.

Figure 2:
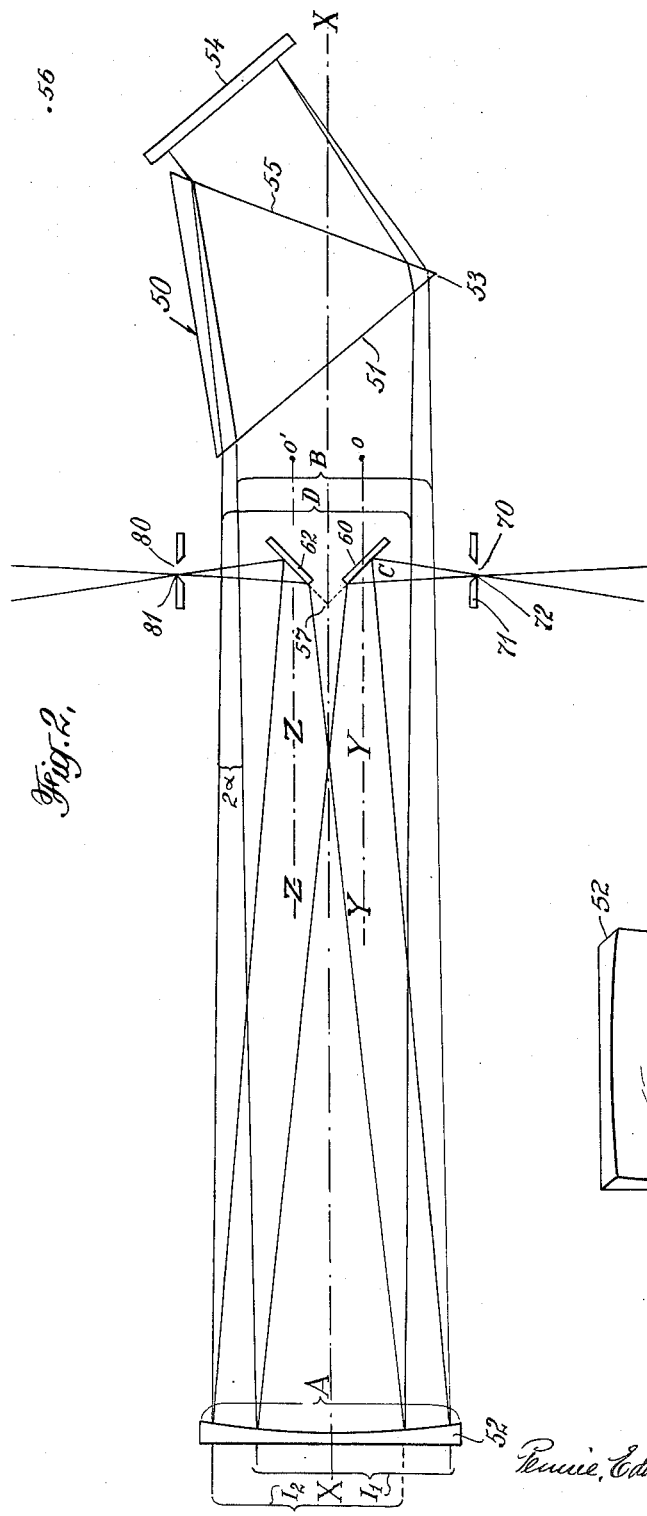
Figure 3:
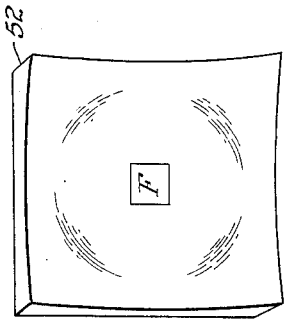

In the accompanying drawings:

Fig. 1 is a plan view of a double monochromator according to the present invention, Fig. 2 is a diagram of the optical principles involved in either half of the double monochromator of Fig. 1, and Fig. 3 is a view in elevation of one of the spherical collimating mirrors of the instrument of Fig. 1.

In the double monochromator of Fig. 1 a base 1 supports two dispersing prisms 2 and 3, rotatable plane "Littrow" mirrors 4 and 5 for selecting the wave length transmitted through the instrument, entrance, middle and exit slits 7, 9 and 11, and all necessary collimating and reflecting elements as will be hereinafter described.

Light entering the instrument passes through the entrance slit 7 and is reflected by a plane mirror 14 onto a spherical collimating mirror 15. The entering light is rendered parallel by the spherical mirror 15 and makes a first pass through the first dispersing prism 2. It is then reflected from the first wave length selecting mirror 4. The light returning from the mirror 4 is dispersed a second time on its second transit through the prism 2. Of the light returned through the prism 2 only a component of a relatively narrow band of wave lengths determined by the orientation of the plane mirror 4 is focused by the spherical mirror 15 into an image of the entrance slit 7 which is cast upon the middle slit 9 by a second plane mirror 16. The mirrors 14 and 16 are conveniently formed by silvering the faces of a prism 13, and constitute Newtonian mirrors since they lie respectively within the parallel beams which are formed at the spherical mirror 15 by the cones which are reflected at these Newtonian mirrors.

The light which gets through the middle slit 9 is reflected at a third Newtonian mirror 17 onto a second spherical mirror 19 which returns this light parallel for passage through the second dispersing prism 3. After passing twice through the second prism 3 light of a high degree of purity is focused by the mirror 19 on the exit slit 11 after reflection at a fourth Newtonian mirror 18. The light emerging from the exit slit passes to a further plane mirror 21 and thence to a detecting element such as a thermocouple 35 after reflection at an ellipsoidal mirror 24. The entrance, middle and exit slits may therefore all lie in parallel planes.

The slits 7, 9, and 11 or any one or more of them may be provided with movable jaws which may be linked by suitable mechanism with the wave length drive which rotates the Littrow mirrors 4 and 5 so that the slit openings will vary according to any desired function with the wave length of the light passing through the instrument. A slit width and wave length drive suitable for this purpose is disclosed and claimed in the copending application of Clair L. Farrand, Ser. No. 79,099, filed March 1, 1949, which is assigned to the assignee hereof, now Patent No. 2,587,451.

Referring to Fig. 2, the optically essential elements of the monochromator include, apart from a source and a detecting element not shown, a dispersing prism 50, a collimating and focusing mirror 52, a plane Littrow wave length selecting mirror 54, an entrance slit 70, an exit slit 80, and Newtonian reflectors 60 and 62. The spherical mirror, dispersing prism, Newtonian reflectors and slits are (except for small adjustments to the width of the slits), fixedly located with respect to each other on a common base. The Littrow mirror is rotatable about a vertical axis in order to select successive wave lengths for transmission through the instrument. The entrance and exit slits may be either separately or jointly variable in width by appropriate mechanism, not shown, which may be linked to the drive for the Littrow mirror.

The plane of Fig. 2 is a meridian plane of the spherical surface of the mirror 52. The perpendicular X—X to the mirror surface which bisects the aperture A of the mirror in this plane is therefore not only a radius of the mirror surface but the axis of symmetry of the physical mirror. Within (or at least partly within) the aperture A of the mirror 52, i. e. at least partly within the cylinder whose directrix is formed by the outline of the mirror and whose elements are parallel to the axis X—X, there is located on the concave side of the mirror a prism 50, whose faces 51 and 55 intersect in an edge 53, perpendicular to the axis X—X. In Fig. 2, the edge 53 is perpendicular to the plane of the figure. The prism is so located that the axis X—X intersects the face 51 approximately at the center thereof.

The Newtonian mirrors 60 and 62 are also located within the aperture of the spherical mirror 52, between the mirror 52 and the prism 50. The planes of their reflecting surfaces intersect in a line 57 which is parallel to the prism edge 53 and which intersects the axis X—X at right angles. The faces 60 and 62 of the Newtonian mirror are preferably inclined at equal angles to the axis X—X.

Behind the prism 50 is located the plane Littrow mirror 54, rotatable about an axis 56 parallel to the prism edge 53. The prism, the mirrors 54, 60, and 62, and also the entrance and exit slits, are all preferably located with respect to the meridian plane of the figure so as to extend equally above and below it.

The entrance slit 70 has a fixed jaw 71, whose edge 72 is imaged in the Newtonian mirror 60 at O. The slit is so located that the point O lies on the focal surface of the spherical mirror 52, at a distance half-way between the surface of the mirror and its center of curvature. Accordingly the true axis of the mirror 52 with respect to the point O and hence with respect to the entrance slit is the dotted line Y—Y passing through O and the center of curvature of the mirror. Rays diverging actually from the entrance slit 70 and virtually from the point O which are paraxial to the line Y—Y will therefore be transformed upon reflection at the mirror 52 into a bundle of parallel rays parallel to the axis Y—Y. The mirror 60 is so proportioned that the light diverging from the entrance slit which is reflected at the mirror 60 is in fact paraxial to the line Y—Y, and this light is transformed by the mirror 52 which it strikes at a zone I₁ into a parallel bundle indicated at B. The parallel bundle B passes the Newtonian reflectors on either side thereof and is refracted through the dispersing prism 50 into incidence on the Littrow mirror 54. As will be subsequently described in connection with Fig. 3, an appropriately shaped area on the face of the mirror 52 is left unsilvered so that the bundle B includes a hole substantially equal to the projection onto the cross section of that bundle of the emergent mirror 62. The limits of the mirror 60 are so chosen that the entering cone C which is transformed upon reflection at the mirror 52 into the parallel bundle B, includes (in the horizontal plane of Fig. 2) rays on both sides of the axis Y—Y belonging to the entrance slit. In consequence the mirror 60 lies wholly within the bundle B.

The exit slit 80 and the second Newtonian mirror 62 are located respectively at the mirror images of the entrance slit 70 and first Newtonian mirror 60 as formed in a plane which contains the system axis X—X and which is parallel to the prism edge 53. In consequence the image of the fixed edge 81 of the exit slit in the mirror 62 lies at a point O' whose true axis Z—Z with respect to the mirror 52 is displaced as far from the axis X—X in one sense as the axis Y—Y is in the other. The image of O' in the mirror 52 is a parallel bundle D which makes with the axis X—X the same angle as the parallel bundle B. The base of the bundle D on the mirror 52 forms a zone I₂ whose limits are displaced from the axis X—X by the same amount but in the opposite direction from the limits of the zone I₁.

Mechanically bilateral slits may be employed in place of the slits having one fixed edge which have been described. In such case the virtual object and image points O and O' refer to the centers of the slits, which are exposed when the slits are opened by a small amount.

The angle 2α between the parallel bundles B and D is equal to the angle subtended at the center of curvature of the mirror 52 between the points O and O'. By locating the mirrors 60 and 62 within the parallel bundles B and D with which they are respectively associated, the off-axis angle α has been held in one embodiment to less than three quarters of a degree for a narrow opening of the slits. As the slits are opened, points progressively farther from the system axis are brought into use. By a very slight oversizing of the prism and mirrors 52 and 54, however, the system provides the same aperture for all of these points.

Especially in applications involving radiation of long wave length, as in the infrared, a source of substantial extent may be necessary. This is provided by producing in the plane of the entrance slit an extended image of a suitable extended source elsewhere located. Even with slits wide open however, the present invention keeps the off-axis position for the slit points farthest removed from the axis below 3°.

Of the color components making up the heterochromatic cone of light C diverging from the entrance slit 70, only the light of a single selected wave length will suffer in its two transits through the prism 50 exactly the deviation required in connection with its reflection at the Littrow mirror 54 to emerge from the prism 50 inclined to the axis X—X by the angle between X—X and the bundle D, i. e. at an inclination of 2α to the bundle B. The light of this wave length is concentrated by the mirror 52 on the exit slit. For any given orientation of the Littrow mirror the light in the bundle B which will re-emerge from the prism at an angle 2α to the bundle B is the light which would, if passing from the spherical mirror to the prism in a direction parallel to the axis X—X, fall upon the Littrow mirror at normal incidence. As the mirror 54 is rotated about its axis 56 parallel to the prism edge, this wave length changes. The mirror 54 need however be rotated through only a relatively small number of degrees in order to shift the selected wave length through the entire range of wave lengths which can be transmitted through a dispersing prism of any given material.

The spherical mirror 52 is preferably of approximately rectangular outline, as shown in Fig. 3, inasmuch as the beams which it must handle are limited in aperture by the rectangular faces of the dispersing prism and of the Littrow mirror behind the prism. The Newtonian mirrors are also rectangular in outline. Since the solid angle subtended at the center of curvature of the spherical mirror by the outlines thereof is very small, the departure of the surface of the spherical mirror from plane is not great. On the surface of mirror 52 there is left unsilvered a rectangular area F, in order to prevent the scattering through the system of undispersed heterochromatic light. As seen in Fig. 2, the bundle B passing from the mirror 52 to the prism 50 for the first transit through the prism surrounds the reflectors 60 and 62. If complete in cross section, the bundle B would contain rays which would be reflected from the face 62 towards the exit slit. The unsilvered zone F is therefore determined in extent and location as the projection onto the mirror 52 of so much of the reflector 62 as lies within the bundle B, taken in the direction of the rays of the bundle B.

In a double monochromator embodying the invention which has been constructed, an aperture of F5 was obtained for each half of the instrument with an off-axis angle of 0° 47' for the fixed edges of the slits. A beam aperture of 56 mm. for the bundles B and D in the horizontal plane ( i. e. the plane parallel to the principal sections of the prism) was obtained with a spherical mirror of 280 mm. focal length having an aperture in the horizontal plane of only 72 mm. The beam aperture of 56 mm. was determined by the Littrow mirror and an associated mask as aperture stop.

With the construction of the present invention the off-axis angle of the fixed edges of the slits can readily be held to 1.5°. In the example above described the off-axis angle for points at the edge of the movable jaws was only some 3° with the slits wide open.

It is of course not necessary to the invention that the spherical mirror be actually symmetric with respect to the system axis in which the Newtonian mirrors and entrance and exit slits are symmetric. The spherical mirror may be made oversized on one or the other side if desired, although it is uneconomic to do so.

The invention has been described in terms of its application to a monochromator, i. e. an instrument for the isolation of a narrow band of wave lengths. Such an instrument is typically used to provide monochromatic illumination of a photoelectric cell or other form of detector. It may of course be used also in the analysis of light of unknown composition, and therefore constitutes a spectrometer. Indeed if the light appearing at the exit slit of the instrument of the invention is observed visually, the instrument may be said to constitute a spectroscope, and if the light there appearing is photographically recorded, the instrument may be said to constitute a spectrograph, all according to the circumstances of its use. Accordingly the instrument of the invention is referred to in the appended claims as a spectrometric instrument.

I claim:

1. A spectrometric instrument comprising a spherical mirror, a dispersing prism having a face substantially centered on a radius of the spherical mirror which is substantially centered on the area of the spherical mirror, the prism having its edge perpendicular to the said radius, the separation of the intersections of the said radius with the surface of the spherical mirror and with the said prism face being not less than one half the radius of curvature of the spherical mirror, a plane Littrow mirror supported behind the prism for rotation about an axis parallel to the face of the Littrow mirror and parallel to the edge of the prism, two Newtonian mirrors having plane faces whose planes intersect along a line parallel to the edge of the prism, the said line intersecting the said radius at a point intermediate the spherical mirror and the prism, an entrance slit so located that its image in the closer of the Newtonian mirrors lies on the focal surface of the spherical mirror at an angular separation from the said radius not exceeding 1.5 degrees measured at the center of curvature of the spherical mirror, and an exit slit located at the mirror image position of the entrance slit in the plane containing said radius and parallel to the prism edge.

2. A spectrometric instrument comprising a spherical mirror, a dispersing prism located at least partly within the aperture of the spherical mirror, two Newtonian reflectors having plane faces intersecting along a line parallel to the prism edge, the said line of intersection intersecting a radius of the spherical mirror which intersects a face of the prism and the spherical mirror in the vicinity of the centers of the respective areas thereof, a plane Littrow mirror rotatable about an axis parallel to its face and parallel to the edge of the prism, an entrance slit whose image in the closer of the two Newtonian reflectors lies on the focal surface of the spherical mirror, and an exit slit positioned to coincide substantially with the image of the entrance slit in the plane containing the said radius of the spherical mirror and parallel to the prism edge; the spherical mirror, prism and Littrow mirror being so proportioned that the cone of rays diverging from the entrance slit whose base on the spherical mirror is the base of the parallel bundle falling on the Littrow mirror includes rays diverging on all sides of the true axis of the spherical mirror with respect to the image of the apex of the cone in the Newtonian reflector associated with the entrance slit.

3. A spectrometric instrument comprising a spherical mirror, a dispersing prism located at least partly within the aperture of the mirror, two Newtonian reflectors having plane faces intersecting along a line parallel to the prism edge, the said line of intersection intersecting a radius of the spherical mirror which intersects a face of the prism and the spherical mirror in the vicinity of the centers of the respective areas thereof, a plane Littrow mirror rotatable about an axis parallel to its face and parallel to the edge of the prism, an entrance slit whose image in the closer of the two Newtonian reflectors lies on the focal surface of the spherical mirror, an exit slit whose image in the other Newtonian reflector lies on the focal surface of the mirror, the spherical mirror and Littrow mirrows being so proportioned that the cone of rays diverging from the entrance slit whose base on the spherical mirror is the base of the parallel bundle falling on the Littrow mirror after refraction through the prism includes rays diverging on all sides of the true axis of the spherical mirror with respect to the image of the apex of the cone in the Newtonian reflector associated with the entrance slit, the exit slit being so located that the light of the wave length which after a first refraction through the prism, reflection at the Littrow mirror and a second refraction through the prism emerges from the prism at an angle to the said radius equal to the angular departure of the image of the entrance slit in its associated Newtonian reflector from the said radius will be focused by the spherical mirror on the exit slit.

4. A spectrometric instrument comprising a spherical mirror, a dispersing prism located at least partly within the aperture of the mirror, two Newtonian reflectors having plane faces intersecting along a line parallel to the prism edge, the said line of intersection intersecting a radius of the spherical mirror which intersects a face of the prism and the spherical mirror in the vicinity of the centers of the respective areas thereof, a plane Littrow mirror mounted behind the prism for rotation about an axis parallel to its face and parallel to the edge of the prism, an entrance slit whose image in the closer of the two Newtonian reflectors lies on the focal surface of the spherical mirror, an exit slit whose image in the other Newtonian reflector lies on the focal surface of the mirror, the spherical mirror and Littrow mirror being so proportioned that the cone of rays diverging from the entrance slit to form upon reflection at the spherical mirror a parallel bundle limited in aperture by the Littrow mirror includes rays diverging on all sides of the true axis of the spherical mirror with respect to the image of the entrance slit in the Newtonian reflector associated with the entrance slit.

5. A spectrometric instrument comprising a spherical mirror, a dispersing element spaced from the spherical mirror in position to receive light reflected thereat from sources located actually or virtually on the focal surface thereof close to the axis of symmetry thereof, an entrance slit and associated entrance slit mirror and an exit slit and associated exit slit mirror, said entrance slit and entrance slit mirror being so located that the image of the entrance slit in the entrance slit mirror lies on the focal surface of the spherical mirror on a radius thereof not more than 1.5 degrees removed from the said axis of symmetry, the exit slit and exit slit mirror being so positioned that the image of the entrance slit, as successively formed in the entrance slit mirror, spherical mirror, dispersing element, spherical mirror, and exit slit mirror falls upon the exit slit when formed by light of that wave length which after dispersion at the dispersing element returns to the spherical mirror in a bundle inclined to the said axis of symmetry at an angle equal to the angular separation of the said axis of symmetry from the true axis of the spherical mirror with respect to the image of the entrance slit in the entrance slit mirror.

6. A spectrometric instrument comprising a spherical mirror, a dispersing element spaced from the spherical mirror in position to receive light reflected thereat from sources located actually or virtually on the focal surface thereof close to the axis of symmetry thereof, an entrance slit and associated entrance slit mirror and an exit slit and associated exit slit mirror, said entrance slit and entrance slit mirror being so located that the image of the entrance slit in the entrance slit mirror lies on the focal surface of the spherical mirror, the entrance slit and associated slit mirror being so positioned that the cone of rays diverging from the entrance slit which after reflection at the entrance slit mirror and at the spherical mirror is transformed into a parallel bundle capable of passing through the aperture stop of the monochromator includes rays on all sides of the true axis of the spherical mirror with respect to the image of the entrance slit in the entrance slit mirror, the exit slit and exit slit mirror being so positioned that the image of the entrance slit, as successively formed in the entrance slit mirror, spherical mirror, dispersing element, spherical mirror, and exit slit mirror falls upon the exit slit when formed by light of that wave length which after dispersion at the dispersing element returns to the spherical mirror in a bundle inclined to the said axis of symmetry at an angle equal to the angular separation of the said axis of symmetry from the true axis of the spherical mirror with respect to the image of the entrance slit in the entrance slit mirror.

7. A spectrometric instrument comprising a dispersing element, a spherical mirror spaced from the dispersing element with the axis of symmetry of the spherical mirror intersecting the dispersing element, two Newtonian mirrors disposed between the spherical mirror and the dispersing element within the volume defined by a cylinder whose generators are parallel to the said axis of symmetry and whost directrix is the outline of the spherical mirror, an entrance slit located adjacent one of the Newtonian mirrors in such position that its image in the adjacent Newtonian mirror lies on the focal surface of the spherical mirror, and an exit slit located adjacent the other Newtonian mirror in such position that its image in the other Newtonian mirror lies on the focal surface of the spherical mirror, the location of the entrance slit being further characterized by the fact that the cone of light virtually diverging from the image of the said entrance slit in the said adjacent Newtonian mirror as virtual source and delimited by the parallel bundle of rays produced upon reflection of the said cone at the spherical mirror and passing through the aperture stop of the monochromator includes rays on all sides of the true axis of the spherical mirror with respect to the image of the entrance slit in the said adjacent Newtonian mirror.

SEYMOUR ROSIN.

REFERENCES CITED

The following references are of record in the file of this patent:

UNITED STATES PATENTS

| Number | Name | Date |
|---|---|---|
| 2,462,946 | Coggeshall et al. | Mar. 1, 1949 |

FOREIGN PATENTS

| Number | Country | Date |
|---|---|---|
| 363,264 | Great Britain | Dec. 17, 1931 |
| 503,167 | Great Britain | Apr. 3, 1939 |
| 720,177 | Germany | Apr. 2, 1942 |

OTHER REFERENCES

Hardy et al., "Principles of Optics," first edition, 1932, McGraw-Hill Book Co., New York, N. Y., pages 488, 557. (Copy in Div. 7.)

Sawyer, R. A., "Experimental Spectroscopy," 1946, Prentiss-Hall Inc., New York, N. Y., pages 81–83, 280. (Copy in Div. 7.)

Harrison et al., "Practical Spectroscopy," 1948, Prentiss-Hall Inc., New York, N. Y., pages 478–481. (Copy in Div. 7.)